UNITED STATES PATENT OFFICE 2,044,868

SULPHUR DYESTUFFS

Werner Zerweck, Frankfort-on-the-Main/Fechenheim, Germany, assignor to General Aniline Works, Inc., New York, N. Y., a corporation of Delaware No Drawing. Application July 11, 1933, Serial No. 679,985. In Germany July 19, 1932

6 Claims. (Cl. 260—19)

My present invention relates to new sulphur dyestuffs obtained by sulphurizing phenoxazones-2.

It is well known that thiazones and hydroxyazines are converted by the action of sulphurizing agents into valuable sulphur dyestuffs.

My present invention has for its object new sulphur dyestuffs which are obtained by treating with sulphurizing agents according to the methods usual for the production of sulphur dyestuffs phenoxazones-2 of the general formula:

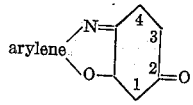

which may be substituted in the arylene radicle by any substituent and in the quinoid nucleus by halogen atoms.

Nitrated derivatives of such phenoxazones-2 are obtainable by condensing nitro-o-aminophenols or nitro-o-aminonaphthols respectively with benzo-quinones or halogenated derivatives thereof according to U. S. application Serial Number 679,984, filed by Georg Kalischer and Werner Zerweck July 11, 1933. The corresponding aminobodies obtained therefrom by reduction in the usual manner are particularly suitable intermediates for the conversion into sulphur dyestuffs. The nitrobodies yield substantially the same dyestuffs, since the nitrogroups are reduced by the process of sulphurization. Instead of the aminobodies likewise their N-alkyl-, N-aryl- and N-aralkylderivatives and their N-acylderivatives are suitable. The latter yield sulphur dyestuffs of other shades than those of the dyestuffs derived from the aminobodies.

Likewise the unsubstituted phenoxazone-2 itself and its otherwise substituted derivatives such as the alkylderivatives which are obtainable by starting from the nitrocompounds by converting the nitrogroups into the aminogroup, diazotization and replacing the diazogroups by hydrogen yield valuable sulphur-dyestuffs. The sulphur dyestuffs of this new series dye the vegetable fiber from the sodium sulphide or hydrosulphite bath bright mostly brown and violet to blue shades of a good fastness, the fastness to light being in most cases superior to that of the sulphur dyestuffs of the thiazine and azine series. In almost all cases the new dyestuffs surpass the said known dyestuffs from the point of view of intensity.

The fact that phenoxazones -2 can be converted into sulphur dyestuffs of such technical importance, is surprising and could not be foreseen, cf. the statements on pages 78 and 168 of the well known compendium of Otto Lange: "Die Schwefelfarbstoffe und ihre Herstellung und Verwendung" Leipzig 1912, wherein it is said that oxazines do not come into consideration as initial products for the manufacture of sulphur dyestuffs because they do not have an affinity for cotton.

In order to further illustrate my invention the following examples are given, the parts being by weight and all temperatures in centigrade degrees. But I wish it to be understood that my invention is not limited to the particular conditions nor specific products mentioned therein.

Example 1

10 parts of 1,3,4-trichloro-phenoxazone-2 of the probable formula:

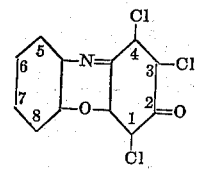

recrystallizing from butylalcohol as reddish brown crystals and soluble in concentrated sulphuric acid with a green color, (obtained by condensing 5-nitro-2-aminophenol with chloranil, reducing the formed 1,3,4-trichloro-7-nitro-phenoxazone-2 by means of an alkaline hydrosulphite solution, diazotizing the amino compound thus formed and splitting off the diazogroup by boiling off with alcohol) are mixed with 28 parts of sodium sulphide of 94% strength, and 32.8 parts of sulphur and about 400 parts of alcohol and the mixture is boiled for some hours in an apparatus provided with a reflux condenser. Then the alcohol is distilled off in vacuo and the residue is worked up in the usual manner. The new sulphur dyestuff thus formed dyes cotton from a yellowish colored sodium sulphide solution strong yellowish brown shades of a good fastness to light. It dissolves in concentrated sulphuric acid with a dull violet color.

When starting from 1,3,4-trichloro-6-methyl-phenoxazone-2 of the formula:

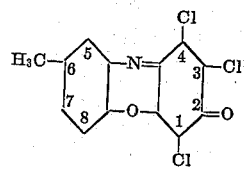

which is obtainable as described above by starting from 1,3,4-trichloro-6-methyl-7-nitrophenoxazon-2 a dyestuff of very similar properties is obtained.

Example 2

10 parts of 1,3,4-trichloro-7-aminophenoxazon-2 of the probable formula:

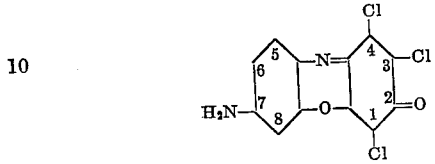

prepared by reducing with an alkaline hydrosulphide solution the 1,3,4-trichloro-7-nitrophenoxazon-2 are boiled with 14 parts of sodium sulphide of 94% strength and 16.4 parts of sulphur in about 200 parts of alcohol for some hours under reflux. When cool the precipitated dyestuff is isolated in the usual manner. It dyes from a red sodium sulphide solution bright and full bluish red shades of a good fastness, particularly to light. It dissolves in concentrated sulphuric acid with a bright blue color.

A similar dyestuff is obtained when starting from 1,3,4-trichloro-5,6-benzo-7-aminophenoazazone-2 which is obtainable by condensing chloranil with 4-nitro-1-amino-2-naphthol and reducing the formed nitrocompound.

Example 3

When working as described in the foregoing example, but using as initial product the 1,3,4,6-tetrachloro-7-amino-phenoxazone-2 of the formula:

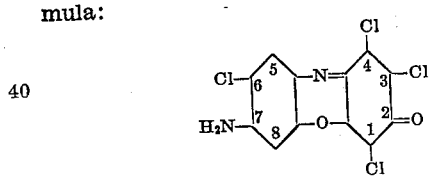

the formed dyestuff dyes cotton very strong bright violet shades.

Example 4

To a solution of 180 parts of crystallized sodium sulphide and 58.5 parts of sulphur in such an amount of water that the total volume is about 850 parts by volume, 12 parts of glycerine, 90 parts of 1,3,4-trichloro-6-methyl-7-amino-phenoxazon-2 and about 90 parts of sodium chloride is added, then the mixture is slowly heated to boiling and boiling is continued for some hours under reflux. The precipitated dyestuff is filtered off when cool and worked up as usual. It dyes cotton from a red sodium sulphide or colorless hydrosulphite bath bright reddish blue shades. It dissolves in concentrated sulphuric acid with a bright blue color.

Example 5

10 parts of 1,3,4-trichloro-7-nitrophenoxazone-2 are mixed while stirring with a solution of 21 parts of sodium sulphide of 94% strength and 24.6 parts of sulphur in about 350 parts of alcohol, the mixture is heated to boiling and boiling is continued while stirring under reflux until the dyestuff formation has been finished, the alcohol is distilled off and the residue is worked up in the usual manner. The dyestuff thus obtained is very similar to that of Example 2.

Example 6

To a hot solution of 9.5 parts of concentrated sodium sulphide and 7 parts of sulphur in 60 parts of butylalcohol while stirring 8 parts of sulphur and 4 parts of 7-dimethyl-amino-phenoxazone-1 are added. This latter compound of the formula:

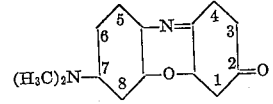

known as "resorcine blue" is obtainable for example by condensing nitrosoresorcine with dimethyl-m-aminophenol. The aforesaid mixture is boiled for some hours in an apparatus provided with a stirrer and a reflux condenser and after cooling down the formed dyestuff is isolated in the usual manner. It dyes cotton from the hydrosulphite bath pure strong blue shades of a good fastness. It dissolves in concentrated sulphuric acid with a dark blue color.

A likewise blue dyeing dyestuff is obtained when sulphurizing the 1,3,4-trichloro-7-benzylamino-phenoxazone-2 of the formula:

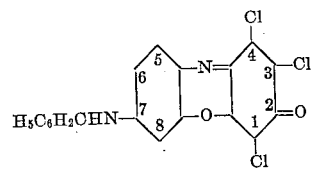

which is obtainable by acting with benzylchloride on 1,3,4-trichloro-7-amino-phenoxazone-2 or when starting from 1,3,4-trichloro-7-phenylamino-phenoxazone-2.

Example 7

10 parts of 1,3,4-trichloro-7-benzoylamino-phenoxazone-2 of the probable formula:

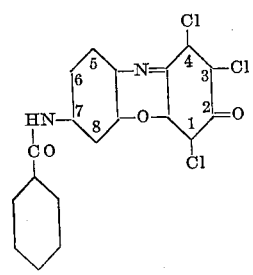

obtainable by heating the corresponding amine with benzoyl chloride in the presence of trichlorobenzene, are added at about 60° to an aqueous polysulphide solution, prepared from 24 parts of crystallized sodium sulphide and 7.8 parts of sulphur, 3 parts of glycerine and 12 parts of sodium chloride, the mixture is slowly heated to boiling and the boiling is continued for some hours until the dyestuff formation is complete. The separated sulphur dyestuff is isolated in the usual manner. It forms a brown powder soluble in concentrated sulphuric acid with a violet color. It dyes cotton from the sodium sulphide bath very bright reddish brown shades of good fastness particularly to light.

When using the corresponding 1,3,4-trichloro-7-(3'-methoxybenzoyl)-amino-phenoxazone-2 the formed sulphur dyestuff dissolves in concentrated surphuric acid with a reddish violet color and dyes cotton from a brownish yellow sodium sulphide bath more yellowish reddish brown shades.

When carrying out the process of sulphurizing the benzoylamino-compound in the presence of alcohol the formed dyestuff dyes cotton more violet reddish brown shades.

A likewise bright reddish brown sulphur dyestuff is obtained when starting from the 1,3,4-trichloro-6-methyl-7-benzoylamino-phenoxazone-2. The 1,3,4-trichloro-6-benzoylamino-phenoxazone-2 yields a likewise brownish dyeing dyestuff.

Example 8

10 parts of 1,3,4-trichloro-7-acetylamino-phenoxazone-2 of the formula:

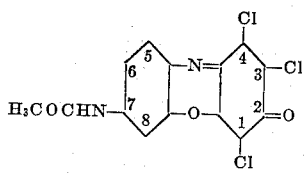

(obtainable for instance by heating the corresponding 7-amino-compound with acetic acid anhydride in the presence of trichloro-benzene) are mixed with 18 parts of concentrated sodium sulphide, 22 parts of sulphur and 110 parts of butylalcohol and the mixture is boiled for some hours under reflux. The precipitated dyestuff is filtered off and worked up as usual. It represents when dry a blackish brown powder soluble in concentrated sulphuric acid with a bluish red color. It dyes cotton from a brownish yellow sodium sulphide bath violet reddish brown shades.

Example 9

10 parts of a product of the probable formula:

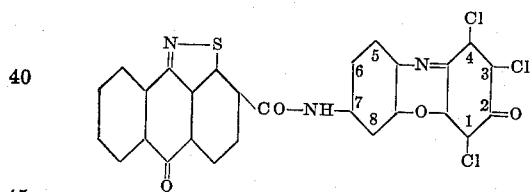

obtained by condensing 1,3,4-trichloro-7-amino-phenoxazon-2 with 1,9-thiazolanthrone-2-carboxylic acid chloride are mixed with a solution of 14 parts of sodium sulphide of 94% strength and 16.4 parts of sulphur in 175 parts of alcohol and the mixture is boiled for some hours under reflux. The precipitated dyestuff is isolated as usual. It dissolves in concentrated sulphuric acid with a bluish green color and dyes the vegetable fiber from a red sodium sulphide bath yellowish reddish brown shades.

Example 10

10 parts of 1,3,4-trichloro-7-(4'-nitrobenzoyl)-amino-phenoxazone-2 of the probable formula:

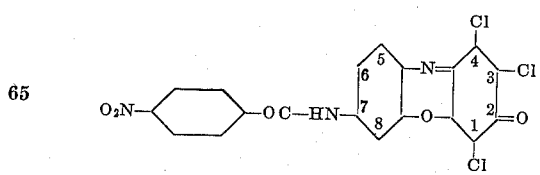

obtainable by heating the corresponding amine with p-nitro-benzoylchloride in the presence of o-dichlorobenzene are subjected to the action of an aqueous polysulphide fusion as described in Example 7. The formed dyestuff dissolves in concentrated sulphuric acid with a violet color and dyes the vegetable fiber from the sodium sulphide bath violet shades of a good fastness. The new dyestuff is distinguished by a particularly strong tinctorial power.

When starting from the 1,3,4-trichloro-7-(3'-nitro-benzoyl)-amino-phenoxazone-2 a sulphur dyestuff is obtained dyeing bright reddish brown shades.

I claim:

1. Sulphur dyestuffs obtained by sulphurizing according to one of the methods usual for the production of sulphur dyestuffs phenoxazones-2 of the general formula:

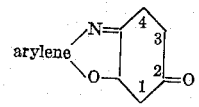

which may be substituted in the arylene radicle by a substituent of the group consisting of halogen, alkyl, nitro, amino and substituted amino groups and in the quinoid nucleus by halogen atoms, which dyestuffs dye the vegetable fiber bright mostly brown and violet to blue shades of a good fastness particularly to light.

2. Sulphur dyestuffs obtained by sulphurizing according to one of the methods usual for the production of sulphur dyestuffs phenoxazones-2 of the general formula:

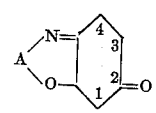

in which A represents a benzenoid nucleus which may be substituted by a substituent selected from the group consisting of halogen, alkyl, nitro, amino and substituted amino groups and in which the quinoid nucleus may be substituted by halogen atoms, which dyestuffs dye the vegetable fiber bright mostly brown and violet to blue shades of a good fastness particularly to light.

3. Sulphur dyestuffs obtained by sulphurizing according to one of the methods usual for the production of sulphur dyestuffs phenoxazones-2 of the general formula:

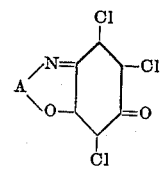

in which A represents a benzenoid nucleus which may be substituted by a substituent selected from the group consisting of halogen, alkyl, nitro, amino and substituted amino groups, which dyestuffs dye the vegetable fiber bright mostly brown and violet to blue shades of a good fastness particularly to light.

4. Sulphur dyestuffs obtained by sulphurizing according to one of the methods usual for the production of sulphur dyestuffs phenoxazones-2 of the general formula:

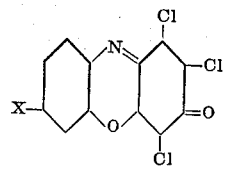

in which X represents an animo group, which dyestuffs dye the vegetable fiber bright mostly brown and violet to blue shades of a good fastness particularly to light.

5. A sulphur dyestuff obtained by sulphurizing according to one of the methods usual for the production of sulphur dyestuffs the 1,3,4-trichloro-7-aminophenoxazone-2 of the formula:

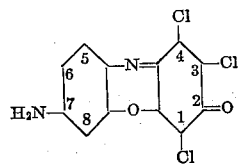

which dyestuff dissolves in concentrated sulphuric acid with a bright blue color and dyes the vegetable fiber from a red sodium sulphide solution bright and full bluish red shades of a good fastness, particularly to light.

6. A sulphur dyestuff obtained by sulphurizing according to one of the methods usual for the production of sulphur dyestuffs the 1,3,4-trichloro-7-benzoylamino-phenoxazone-2 of the formula:

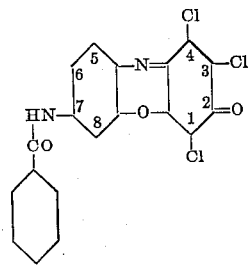

which dyestuff dissolves in concentrated sulphuric acid with a violet color and dyes the vegetable fiber from a sodium sulphide solution reddish brown shades of a good fastness, particularly to light.

WERNER ZERWECK.